United States Patent
Watson

[15] 3,672,213
[45] June 27, 1972

[54] TORQUE TRANSDUCERS
[72] Inventor: Kenneth Watson, Yeovil, England
[73] Assignee: Westland Aircraft Limited, Yeovil, Somerset, England
[22] Filed: Aug. 12, 1970
[21] Appl. No.: 63,074

[30] Foreign Application Priority Data
Aug. 22, 1969   Great Britain......................41,997/69

[52] U.S. Cl. ..........................................................73/136 A
[51] Int. Cl. ...............................................................G01l 3/10
[58] Field of Search ...................73/136 A, 133, 141 A, 88.5; 287/124; 85/83-90

[56] References Cited

UNITED STATES PATENTS

| | | | |
|---|---|---|---|
| 2,392,293 | 1/1946 | Ruge | 73/136 |
| 2,564,484 | 8/1951 | Kuehni | 73/136 |
| 3,426,586 | 2/1969 | Kadlec | 73/88.5 |
| 3,224,262 | 12/1965 | Shipley | 73/136 |
| 623,507 | 4/1899 | Barnish | 287/124 |
| 3,318,183 | 5/1967 | Fischer | 85/84 |
| 2,326,866 | 8/1943 | Kincaid | 287/124 |
| 3,473,369 | 10/1969 | Garrison | 73/65 |
| 2,679,755 | 6/1954 | Mohnkern | 73/136 |
| 3,225,592 | 12/1965 | Green | 73/136 |

Primary Examiner—Richard C. Queisser
Assistant Examiner—Herbert Goldstein
Attorney—Larson, Taylor and Hinds

[57] ABSTRACT

A torque transducer for insertion within a hollow shaft consisting of a tube with expansible ends and having a waisted portion along a predetermined length forming a housing for strain gauges.

The expansible ends of the tube comprise expansion bolts to give a non-slip pressure face contact with the inside face of the shaft on which torque measurements are required.

6 Claims, 1 Drawing Figure

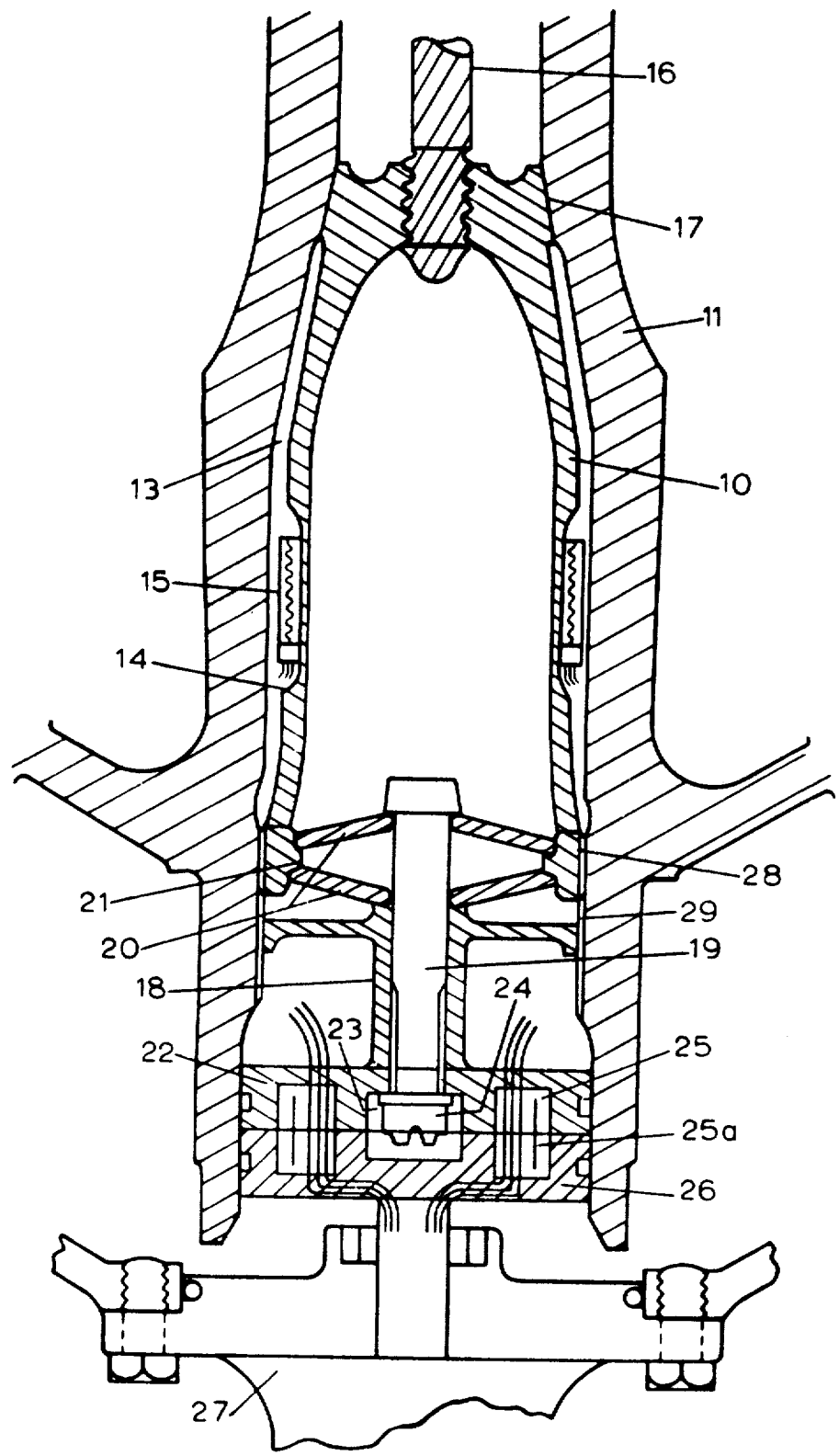

TORQUE TRANSDUCERS

This invention relates to a transducer for providing a signal or signals for measuring loads on shafts, particularly but not exclusively, to rotating shafts driving or being driven on rotary wing aircraft and airborne vehicles.

Known prior art for measuring such loads as torque, bending and tension, usually refer to strain gauges either of the passive or active type secured by chemical means to the portion of the shaft where it is desired to measure such loads.

Such methods have a number of disadvantages, the chief of which is that a multiplicity of strain gauges are required to cover a given length of shaft, generally necessitating the complication of slip rings for the input and output connections of the strain gauges with relatively large numbers of cables and greater susceptibility to failure.

The number of strain gauges necessary to obtain satisfactory torque readings depends on the characteristics of the shaft on which such measurements are required, inasmuch that the greater the rigidity of the shaft the smaller is the torsional reaction under load, thereby requiring measurements over a greater surface area.

It is the object of this invention to eliminate or at least considerably reduce these disadvantages and provide a compact and efficient transducer unit which will give sensitive readings from any type of hollow shaft with a minimum number of strain gauges.

According to the invention I provide a torque transducer for insertion in a hollow shaft consisting of support means for one or more strain gauge elements, said means being positioned within and operably associated with said shaft.

In a preferred embodiment of the invention I provide a torque transducer consisting of an expansible tube having a waisted or channel portion along a predetermined length of the tube forming a housing for at least one strain gauge element, the ends of the tube having expanding means to give a non-slipping pressure surface contact on the inside surface of the hollow shaft.

In one embodiment of the invention the expanding means at the ends of the tube comprise expansion bolts with tapered ends and/or expansion bolts contained within a housing and operably associated at the plain shank end adjacent to the bolt head with angled washers, the periphery of the washers contacting the inside surface of the expansible tube ends.

One feature of the invention lies in the provision of connectors within the housing of the expansion means for electrical attachment of the strain gauges, the connectors may be of the socket or plug type, thereby providing means for connecting the strain gauges to the electronic circuitry necessary to convert the signals from the strain gauges to visual indication, and in addition to apply an electrical potential when active strain gauges are employed.

The invention will now be described with reference to the accompanying drawing.

The expansible tube is generally indicated at 10, and is shown in position within a hollow shaft 11 upon which it is desired to measure the torque.

Tube 10 is waisted along a portion of its length to give a clearance 13 between the inner surface of the hollow shaft 11 and the outer surface of tube 10. This clearance is increased at a predetermined distance along tube 10 to form a housing 14 to accommodate strain gauge or gauges 15.

The entry or insertion end of tube 10 is provided with an expansion bolt 16 having a tapered entry to expand the end of tube 10 to give a non-slip pressure face contact along a predetermined length with the inner wall of hollow shaft 11 at 17.

The opposite end of tube 10 is provided with a housing 18 to locate expansion bolt 19. Two angled washers 20 are located, one under the head of bolt 19 and the other on the end of housing 18, the outer periphery of the washers 20 contacting the inner surface of tube 10 and located by shoulder 21.

Base 22 of housing 18 is recessed at 23 to accommodate nut 24, and provision is also made within the housing base 22 for electrical connectors 25 for the connection of the strain gauge wire leads. These connectors may be of the plug and socket type, as shown on the drawing.

In the embodiment shown which is by way of example only, the remaining plug in portions 25a of connectors 25 are fitted in a second housing 26 which forms the rotor of transformer 27, thereby allowing the wire leads to be connected direct to the transformer and dispensing with the need for slip rings.

The rotary transformer shown is one method of producing a visual indication of changes in strain gauge output relative to changes of torque; this and many other systems are well known and are not considered as part of the invention, therefore, the associated circuitry is not shown.

In operation of the invention, tightening of expansion bolt 16 opens the end of tube 10, applying pressure to the surface contact at 17. At the lower end of tube 10 tightening of nut 24 draws expansion bolt 19 further into housing 18, thereby compressing angled washers 20 and expanding tube 10 to give a pressure contact at 28.

It will be noted that in the embodiment shown the housing 18 and the corresponding end of tube 10 is inserted into hollow shaft 11 onto splines 29. This is not essential but assists in positioning the transducer. The effect of providing a pressure face to face contact is the same.

These two surface contacts at 17 and 28 located along a predetermined length of the inside surface of the hollow shaft 11 on which torque measurements are required gives a sensitive reading for changes of torque regardless of the rigidity of the shaft, since the length of tube 10 may be varied to suit.

It will be appreciated that modifications may be incorporated without affecting the scope of the invention, for instance the expansion bolts, one for each end of the tube, may be one long bolt with a tapered portion or portions to expand the tube ends in a single operation.

The shape or contour of the tube as shown in the drawing is to suit a known hollow shaft, but may be modified to suit any form of shaft.

I claim as my invention:

1. A torque transducer for insertion in a hollow shaft, comprising a tube radially expansible at its ends and having a waisted or channelled portion along a predetermined length of the tube forming a housing for one or more strain gauge elements, at least one of the expansible ends of the tube being fitted with an expansion bolt contained within a housing adapted to be located within the bore of the shaft, the bolt being operably associated at the plain shank end adjacent to the bolt head with angled washers, the peripheries of which contact the inside surface of the expansible end of the tube, the housing incorporating electrical connection means for the strain gauge elements.

2. A torque transducer as claimed in claim 1 wherein at least one of the expansible ends of said tube is axially splined to mate with splines in the bore of the shaft.

3. A torque transducer as claimed in claim 1 wherein said electrical connection means is of the plug and socket type, at least one of the plug and socket being located in said housing at the axial end thereof remote from said tube.

4. A torque transducer as claimed in claim 3 wherein the other member of the plug and socket connection is located in a second housing adapted to be located in the bore of the shaft axially adjacent said first mentioned housing.

5. A torque transducer as claimed in claim 4 wherein said second housing comprises at least part of one of the elements of a rotary transformer having rotor and stator elements.

6. A torque transducer as claimed in claim 5 wherein said second housing forms at least part of the rotor of a rotary transformer.

* * * * *